Figure 1:
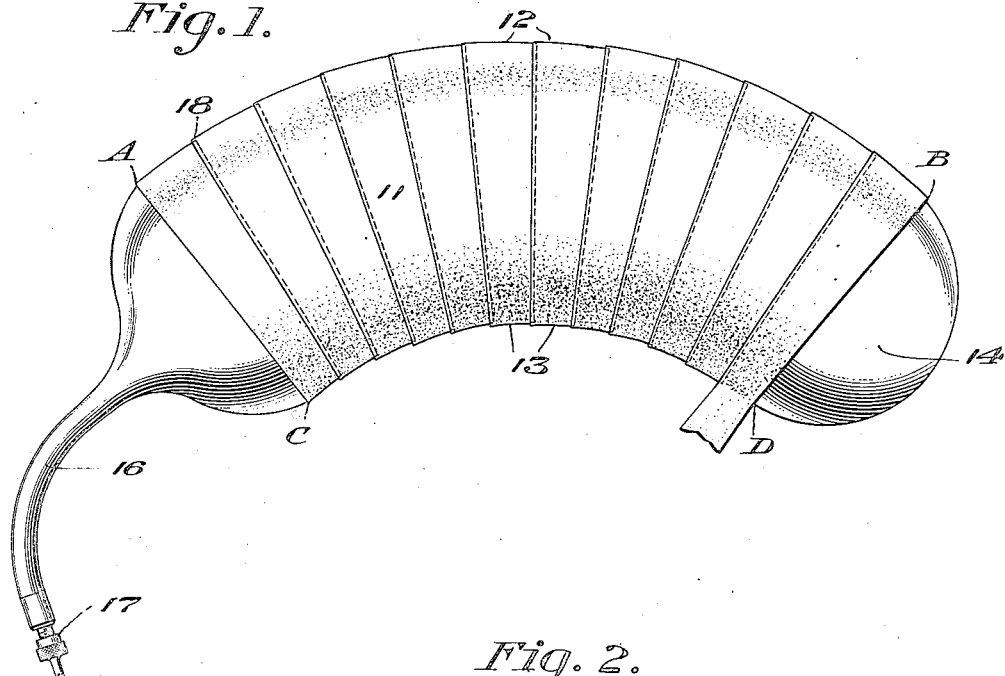

R. S. BURDETTE.
AIR BAG AND METHOD OF WRAPPING THE SAME.
APPLICATION FILED SEPT. 2, 1919.

1,379,598.    Patented May 24, 1921.

Inventor
R. S. Burdette

By
Attorney

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

AIR-BAG AND METHOD OF WRAPPING THE SAME.

1,379,598.   Specification of Letters Patent.   Patented May 24, 1921.

Application filed September 2, 1919. Serial No. 321,130.

*To all whom it may concern:*

Be it known that I, RICHARD S. BURDETTE, a citizen of the United States, and resident of Akron, Ohio, have invented new and useful Improvements in Air-Bags and Methods of Wrapping the Same, of which the following is a specification.

My invention relates to the method of cutting fabric to be used for wrapping objects of annular or segmental shape the cross-section of which annulus is substantially circular, and the invention has particular reference to the method of cutting fabric which is to be used for the manufacture of air bags; these air bags, it will be understood, being utilized in the manufacture or repair of tire casings.

Hitherto, air bags have been made by helically wrapping or winding a tube of rubber with a strip of rubberized fabric the width of which was the same throughout its length, and the structure thus built us, by the application of as many plies as was found desirable, was then cured on a mandrel and in a mold. But it will be at once apparent that, when the fabric strip is of the same width throughout and is slightly overlapped at the outer periphery, there is necessarily a considerably greater overlapping thereof at the inner periphery of the segment, because the inner periphery is much shorter than the outer, hence, there has been a great waste of material from the practice of the former method.

With these objections in mind, it is primarily the object of my invention to avoid this waste of material, by so cutting the fabric used for the purpose described, that the portion thereof which covers the inner periphery shall be such that there is the same degree of overlapping at every point of the winding, and no greater overlapping at the inner periphery than at the outer.

It is a further object of my invention to produce an air bag wrapped as described, the wall of which is of a substantially uniform degree of thickness throughout.

More particularly it is an object of my invention to produce fabric strips for the purposes referred to, having such dimensions that it can be helically wound or coiled on an annular or partially annular object without any waste.

The above and other objects of a similar nature will appear as the description proceeds and the invention will be particularly defined in the claims hereto appended.

Figure 2:
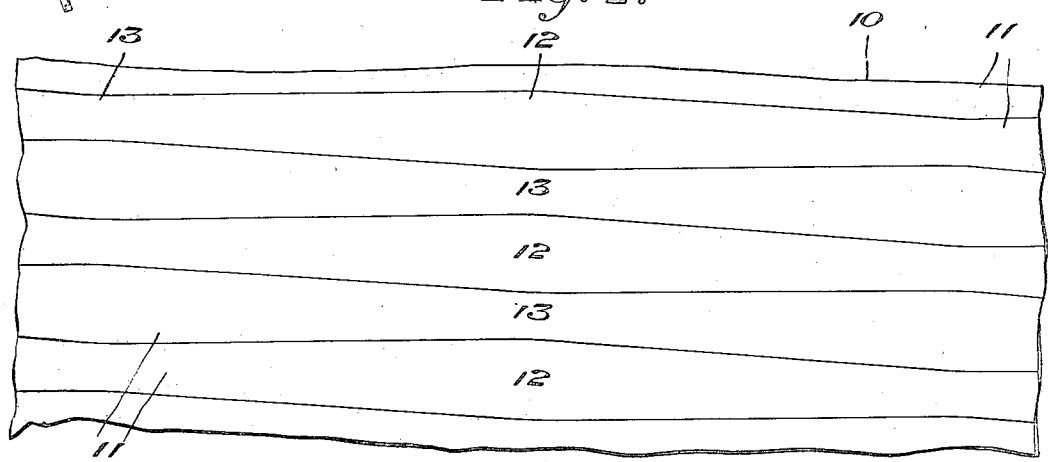

In the drawings, which show the manner in which my invention may be practised and applied, and the strip produced thereby:

Figure 1 is a side view of an air bag to which a strip of fabric cut in accordance with my method has been applied; and Fig. 2 is a plan view of a portion of a fabric strip showing how it is cut into narrower strips.

Referring to the drawings, a length of fabric 10, (preferably rubberized), is cut by any suitable cutting mechanism, into a plurality of narrower strips 11. These strips are so cut that there is a relatively wide portion 12 which tapers uniformly in both directions to a narrow portion 13, the dimensions of the wide and narrow portions 12 and 13 respectively, being carefully precalculated in accordance with the diameters of the object on which they are to be wound. In order that there may be no waste in cutting the material the strips are cut in lines which alternately converge and diverge, the converging lines of one strip constituting the diverging lines of the adjacent strips, as will be understood from an inspection of Fig. 2.

The strips thus produced are then helically wound or coiled on the object, which, in the specific embodiment of the invention, is a rubber tube 14 in the shape of a segment having one end 15 closed, and the other end provided with an air inlet tube 16 and valve 17, for the purpose of inflating the bag with air or steam.

In winding the strip or strips 11 on the tube 14, the edges may be slightly overlapped as at 18, and owing to the fact that said strips 15 have been cut as described, there is no more overlapping at the inner periphery of the annulus than at the outer, as there is where the strips are of the same width throughout their lengths, but the overlapping is substantially the same at the inside as at the outside. When the air bag has been built up by winding thereon the desired or requisite number of plies, it is cured or vulcanized in a mold and is ready for use in the repair of a tire shoe or casing of corresponding size, by insertion therein, and the inclosure of the whole in a mold of suitable dimensions.

In order that a clearer conception of the marked saving of material effected by the practice of my method, the following example is given using the dimensions of a size of air bag in common use:

Assuming that the length of the air bag portion to be covered from the point A to the point B, Fig. 1, be 31.4 inches, and that a single strip of that width throughout be used, and that the circumference of the circle of a cross-section of the bag be 26 inches, then the area of the fabric used will be 31.4 × 26, or 816.4 square inches. If, now instead of the fabric being the same width throughout, it be narrower at the inner periphery, that is to say, of a width determined by the line C—D, which, let it be assumed, would be 18 inches, then the area of the fabric would be less than that of the rectangle 31.4 by 26, by two triangles each having a base of 26 inches and an altitude of $\frac{1}{2}$ (31.4—18); in other words the area of each triangle would be $$\tfrac{1}{2}(26 \times 6.7) = 87.1$$

and that of both triangles $$2 \times 87.1 = 174.2 \text{ square inches,}$$

which figure represents the amount of material saved by my method in winding the bag with one ply fabric. Or, calculated as per cent.

$$\frac{100 \times 174.2}{816.4} = 21.3\%.$$

Hence, on each ply of fabric wound there is a saving of 21.3% of material for the particular size of air bag which serves as the basis of the above example.

It will be seen that the ratio of the width of the wide portion 12 to that of the narrow portion 13 will be equal to the ratio of the circumference of the outer circle to the inner,—or to arcs of those circles subtended by the same center angle,—and since the circumferences of the outer and inner circles are to each other as their radii, then the ratio of the width of the wide portion of the strip to that of the narrow is equal to the ratio of the radius of the outer circle to that of the inner. Further, the distance from the wide portion of the strip to the narrow, measured by a straight line bisecting the angle of divergence, is equal to one-half the circumference of the cross-sectional circle of the air bag annulus.

From the above description it must be apparent that my method is conducive to great economy in the manufacture of air bags or articles of a similar nature, effecting an appreciable saving of whatever wrapping material is used.

While my method has been disclosed as applied to the manufacture of air bags, I do not mean to be limited to that particular use, or in any way except by the claims hereto appended.

What I claim is:

1. The method of producing a strip of fabric for winding about the ring portion of an annular object, which consists in longitudinally cutting a length of fabric to produce uniform alternate wide and narrow portions adapted to cover respectively the outer and inner peripheries of said object.

2. The method of producing a strip of fabric for winding about the ring portion of an annular object, which consists in longitudinally cutting a length of fabric to produce uniform alternate wide and narrow portions, adapted to cover respectively the outer and inner circular peripheries of said object, the ratio of the wide to the narrow portion being substantially the same as the ratio of the radii of the outer and inner circles.

3. The method of producing a strip of fabric for helically coiling about an air bag of segmental shape, which consists in cutting a length of fabric along lines which alternately converge and diverge to produce uniform alternate wide and narrow portions, the width of said wide and narrow portions being predetermined.

4. The method of producing a strip of fabric for helically coiling about a tube curved in the segment of a circle and forming the foundation of an air bag structure, which method consists in longitudinally cutting a length of fabric to produce a strip having uniform alternate wide and narrow portions, the ratio of the width of the wide portion to that of the narrow portion being substantially the same as that of the radii of the outer and inner circles of the segment.

5. The method of producing a strip of fabric for helically coiling about an air bag of segmental shape, which consists in cutting a length of fabric along lines which alternately converge and diverge to produce uniform alternate wide and narrow portions, the width of said wide and narrow portions being predetermined and the longitudinal distance from one wide portion to the next being substantially equal to the circumference of the cross-section of the tube.

6. The method of building up an air bag of the character described, which comprises helically winding thereon a strip of fabric having uniform alternate wide and narrow portions, which are so related that when wound they cover respectively the relatively long outer peripheral surface and the short inner peripheral surface of the bag.

7. The method of building up an air bag of the character described, which comprises helically coiling upon a rubber tube a strip of rubberized fabric having uniform alternate wide and narrow portions, the dimensions of the wide and narrow portions being determined by the relation of the radii of the outer and inner circles of the segment of said air bag.

8. An air bag of arcuate contour comprising an expansible body portion having superposed thereon a helically wound strip of fabric provided with uniform alternate wide and narrow portions.

9. An air bag of arcuate contour comprising an expansible body portion having superposed thereon a helically wound strip of fabric provided with uniform alternate wide and narrow portions, the dimensions of which portions are determined by a fixed law.

10. An air bag of arcuate contour comprising an expansible body portion of vulcanizable material having superposed thereon a helically wound strip of vulcanizable material provided with uniform alternate wide and narrow portions.

11. An air bag of arcuate contour comprising an expansible body portion of vulcanizable material having superposed thereon a helically wound strip of vulcanizable material provided with uniform alternate wide and narrow portions, the dimensions of which portions are determined by a fixed law.

12. An air bag of arcuate contour comprising an expansible body portion and a helical wrapping superposed thereon, the turns thereof overlapping a uniform distance throughout the entire wrapping.

13. An air bag of arcuate contour comprising a hollow body portion of vulcanizable material, and a helical wrapping of vulcanizable material superposed thereon, each turn thereof overlapping the preceding turn a uniform distance throughout the wrapping.

14. An air bag of arcuate contour having an expansible body portion of vulcanizable material, a portion of which is formed of a helical wrapping, the convolutions of which overlap at their contiguous edges a uniform distance throughout the entire wrapping.

In witness whereof, I have hereunto signed my name in the presence of two subscribing witnesses.

RICHARD S. BURDETTE.

Witnesses:
J. E. KEATING,
PHILIP E. BARNES,